United States Patent
Simmons

(10) Patent No.: US 7,481,302 B2
(45) Date of Patent: Jan. 27, 2009

(54) APPARATUS FOR IMPROVING VEHICLE PERFORMANCE

(75) Inventor: Gregory C. Simmons, West Sussex (GB)

(73) Assignee: H-Technologies Limited, Littlehampton, West Sussex (GB)

( * ) Notice: Subject to any disclaimer, the term of this patent is extended or adjusted under 35 U.S.C. 154(b) by 79 days.

(21) Appl. No.: 10/528,185

(22) PCT Filed: Sep. 17, 2003

(86) PCT No.: PCT/GB03/04121

§ 371 (c)(1),
(2), (4) Date: Oct. 3, 2005

(87) PCT Pub. No.: WO2004/026649

PCT Pub. Date: Apr. 1, 2004

(65) Prior Publication Data

US 2008/0006498 A1 Jan. 10, 2008

(30) Foreign Application Priority Data

Sep. 17, 2002 (GB) .................................. 0221575.4

(51) Int. Cl.
*B60T 1/06* (2006.01)
(52) U.S. Cl. .................. 188/18 A; 188/181 A; 188/187
(58) Field of Classification Search ............... 188/18 A, 188/176, 174, 177, 218 R, 218 XL, 73.1, 188/17; 74/5 R, 5.22, 5.44, 572; 280/217, 280/755

See application file for complete search history.

(56) References Cited

U.S. PATENT DOCUMENTS 93,030 A 7/1869 Wortmann (Continued)

FOREIGN PATENT DOCUMENTS

| DE | 835 703 | 4/1952 |
|---|---|---|
| DE | 24 36 546 A1 | 2/1976 |
| DE | 35 42 695 A1 | 6/1987 |
| DE | 195 36 093 A1 | 2/1996 |
| DE | 197 48 628 A1 | 5/1999 |
| DE | 198 25 740 A1 | 12/1999 |
| EP | 1 208 892 A2 | 5/2002 |
| EP | 1 208 892 A3 | 5/2002 |
| EP | 1 208 892 A9 | 5/2002 |
| FR | 1 245 567 | 2/1961 |

*Primary Examiner*—Robert A Siconolfi
*Assistant Examiner*—Mariano Sy
(74) *Attorney, Agent, or Firm*—Darby & Darby

(57) ABSTRACT

There is provided a vehicle, such as a motorcycle, with a flywheel (18) which rotates counter to the direction of rotation of an associated vehicle wheel (10). The flywheel (18) produces a gyroscopic force which is counter the gyroscopic force produced by the rotating wheel (10) and thus reduces or cancels the gyroscopic force of the wheel (10). This can assist changes in tilting of the vehicle and thus in cornering. In the preferred embodiment, the flywheel (18) is a vehicle disc brake (18), which is preferably driven by a planetary gear assembly (54, 60, 62).

11 Claims, 5 Drawing Sheets

U.S. PATENT DOCUMENTS

| | | | |
|---|---|---|---|
| 1,945,874 A | 2/1934 | Weaver | |
| 2,253,408 A | 8/1941 | Watkins et al. | |
| 3,298,485 A * | 1/1967 | Shepard | 188/382 |
| 3,938,628 A * | 2/1976 | Figueroa | 188/18 A |
| 4,036,331 A * | 7/1977 | Hayashi et al. | 188/187 |
| 4,712,806 A * | 12/1987 | Patrin | 280/217 |
| 6,899,212 B2 * | 5/2005 | Li | 188/177 |
| 6,918,467 B2 * | 7/2005 | Kasten | 188/18 A |

* cited by examiner

APPARATUS FOR IMPROVING VEHICLE PERFORMANCE

The present invention relates to a system for improving the performance of a vehicle, particularly a motorcycle or other wheeled vehicle. In the preferred embodiment it relates to a system for reducing the gyroscopic forces produced during operation of a motorcycle.

The dynamic performance of current racing motorcycles is such that the industry is constantly looking for improvements in design that will assist in improving the overall speed of the vehicle. One such area of development is the wheels on which the machine rides. The wheels contribute to the overall performance of the vehicle in several ways: 1) they are the point at which the tyre is connected to the bike, 2) the brake disc is attached to the wheel, providing the mechanism for slowing the vehicle and 3) they provide rotational or gyroscopic characteristics which maintain vehicle stability.

Referring to FIG. 1, a specifically designed gyroscope would usually take the form of a disc-shaped object but can be virtually any object such that when rotated it produces an effective gyroscopic behaviour. Most of a gyroscope's mass should be as far away from the centre as possible. This often results in a disc-shaped object with a large heavy rim, as shown in FIG. 1.

When the gyroscope is not rotating, it behaves like any other object. However, when the gyroscope is spun on its axis at high speed it resists movements in certain directions. When the gyroscope is spinning it can contain large amounts of stored energy. Under Newton's first law of motion it is stated that any body will continue in its state of motion (still or travelling) unless acted upon by an unbalanced force. In the instance of a gyroscope, it will try to compensate for this movement which is known as gyroscopic precession.

The best way to understand gyroscopic precession is to look at two small sections of the gyroscope as it is rotating, the top and the bottom, as shown in FIG. 2. When the force is applied to the axle, the section at the top of the gyroscope will try to move to the left, and the section at the bottom of the gyroscope will try to move to the right, as shown. If the gyroscope is not spinning, then the wheel will fall over. If the gyroscope is spinning, the top point on the gyroscope is acted on by the force applied to the axle and begins to move towards the left. It continues trying to move leftwards because of Newton's first law of motion but its spinning action rotates it as shown in FIG. 3. This effect is the cause of precession. When considering the gyroscope in individual sections, the gyroscope receives forces at one point but then rotates to new positions. When the section at the top of the gyroscope rotates 90 degrees to the side, it continues in its desire to move to the left. This is exactly the same for the section at the bottom, as it rotates 90 degrees to the side and it continues in its desire to move to the right. These forces rotate the wheel in the precession direction. As these points continue to rotate a further 90 degrees, their original motions are cancelled, creating the resistance to the movement of the axis.

In brief, the gyroscopic forces created by the rotating wheel resist the force initially applied to the axle, keeping the wheel steady vertically while the resultant precession force causes the wheel to want to rotate in a direction perpendicular to the rotational axis, as shown by the arrows.

Vehicle stability due to the gyroscopic effect that is induced when the wheel is spinning is a key area when considering overall cornering performance. The design objective has always been to reduce this gyroscopic force as much as possible, by reducing the moment of inertia of the rotating wheel, tyre and disc package. This has mainly been done by reducing the mass of the wheel itself via the use of composites and advances in forged magnesium technology.

The use of composites was considered to be the best way to reduce the wheel mass. However, due to reliability and the inability to test the wheel properly for defects, composites are proving not to be the best solution.

This has led to the development of composite materials such as carbon fibre to manufacture the rims and brake discs. However, the use of these materials in this way has been banned for use in many classes of competition including the World Superbike Championship. In this particular class forged magnesium rims are a good alternative with a front wheel weight of 1.4 kg but the discs have a mass greater than 2 kg each and as you must use ferrous material, therefore it is not possible to alter the disc mass much.

Another limiting factor to the problem is the tyre, as this component is very much a constant with respect to its gyroscopic properties. Some advances have been made over the years, such as by moving away from steel in the case construction to the lighter and more flexible Kevlar. However, unless there is a big leap to another lighter material other than rubber for the bulk of the tyre, there is little possibility of changing its gyroscopic characteristics. It should also be noted when looking at the physics of the tyre as a gyroscope that its mass is all contained near the outer circumference, which is the worst place to have the mass when trying to reduce gyroscopic effects.

There have been design developments in wheel and brake disks to reduce the overall mass of the wheel and disc by mounting a single disc on the outer edge of the wheel, as seen in FIG. 4. However, this does not affect the gyroscopic properties even though the total mass is lighter. This is because the single disc, while being lighter than twin discs, has a larger diameter which increases its gyroscopic output. The net result is a lighter assembly but with the same or similar gyroscopic effects.

The present invention seeks to provide a system and method for improving the performance of a vehicle, in particular a motorcycle.

According to an aspect of the present invention, there is provided a motorcycle or other vehicle including first and second wheel, means providing at least one weight associated with one of said wheels, and rotation means operable to rotate the weight means in an opposite direction to the direction of rotation of said wheel.

The reverse rotation of the weight means produces an opposing gyroscopic force which, in the preferred embodiments, reduces the gyroscopic force produced by the rotating wheels.

Advantageously, the weight means is in the form of a flywheel.

In another embodiment, the weight means is the or part of a braking system of the vehicle. In this embodiment, the weight means may be provided by the brake disc, which is made to rotate in the opposite direction to the direction of rotation of the wheel with which is associated. Of course, in practice, the brake disc could be made only to counter-rotate in a single direction of rotation of the wheel, in practice when the wheel is rotating for a forward motion of the vehicle. This latter feature takes into account the fact that the gyroscopic forces generated during a reverse motion of the vehicle generally do not need correction because of the frequency and speeds of reverse motion.

Where the weight means is the or a part of the vehicle braking system, for example the brake disc, this includes a planetary gear mechanism for rotating the brake disc on the basis of rotation of the vehicle wheel.

Thus, the system of the preferred embodiments rotates a flywheel or other weight about the wheel axis in the reverse direction to the wheel. This can be achieved in several ways the preferred being use of the brake disc as the reverse rotating flywheel. Such apparatus can be integrated with current componentry, such as brake assemblies, forks, body work and the like.

This principle is not limited to motorcycles, as it could be applied to any wheeled vehicle with any number of wheels. Its application, although initially designed for motor sport, can be utilised within the retail motorcycling market to offer improved performance. Moreover, it should also be noted that this principle can be incorporated into both the front and rear wheels.

Embodiments of the present invention are described below, by way of example only, with reference to the accompanying drawings, in which.

Figure 5:
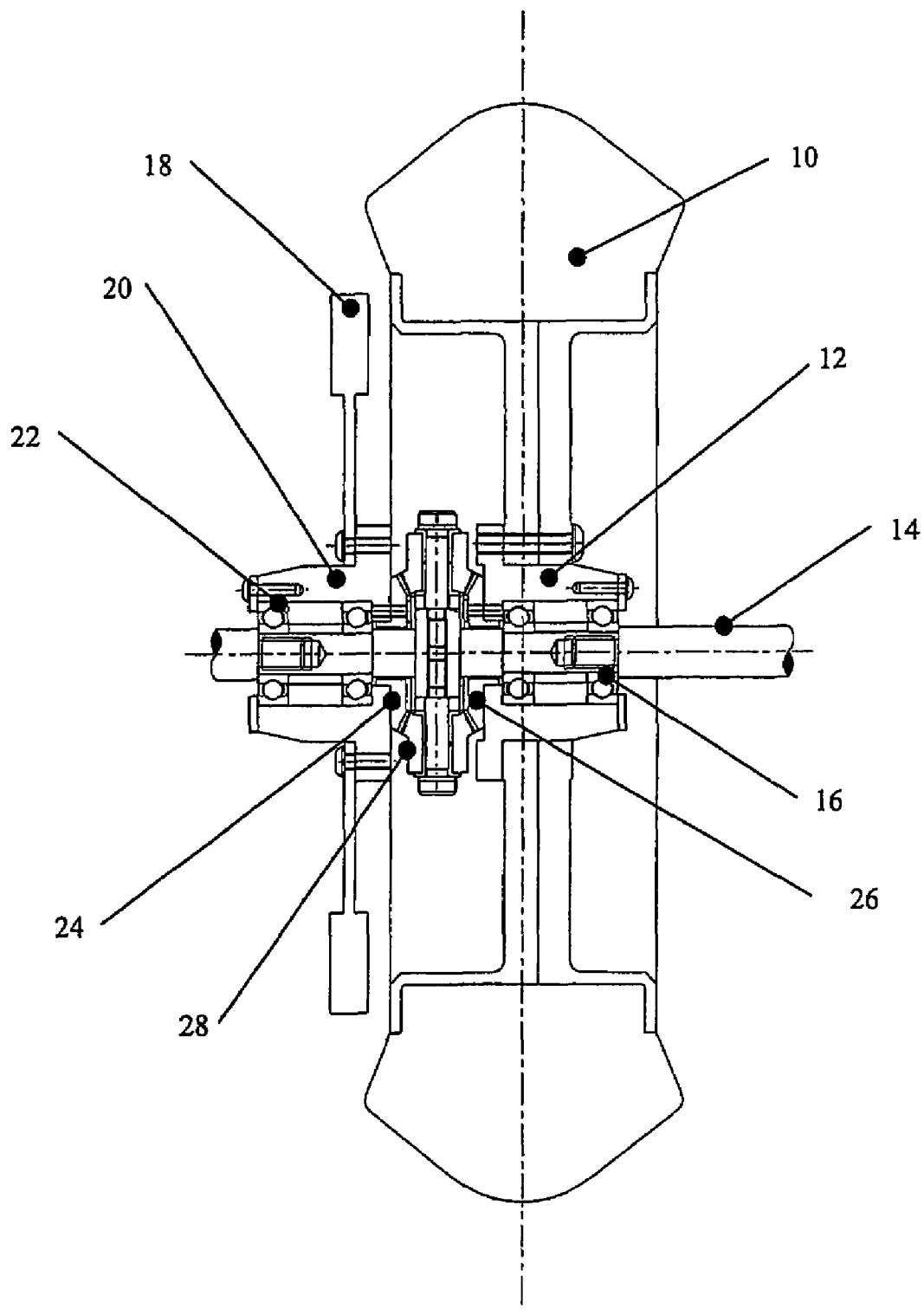
FIG. 5 is a cross-sectional view of a preferred embodiment of system for reducing gyroscopic force.

Referring to FIG. 5, the embodiment shown makes use of the concept of providing a mass which is rotated in the opposite direction and on the same axis as a wheel, such that the resultant gyroscopic forces will work against each other, reducing the total gyroscopic effect during motion of the vehicle, specifically during rotation of the wheel. This mass could be a flywheel assembly totally separate from the wheel, tyre and brake disc assembly, but in its preferred embodiment is the brake disk. From initial calculations, the effect is so great that in some embodiments it may be desirable to have only one brake disc contra-rotating and the other rotating in the same direction as the wheel.

Figure 1:
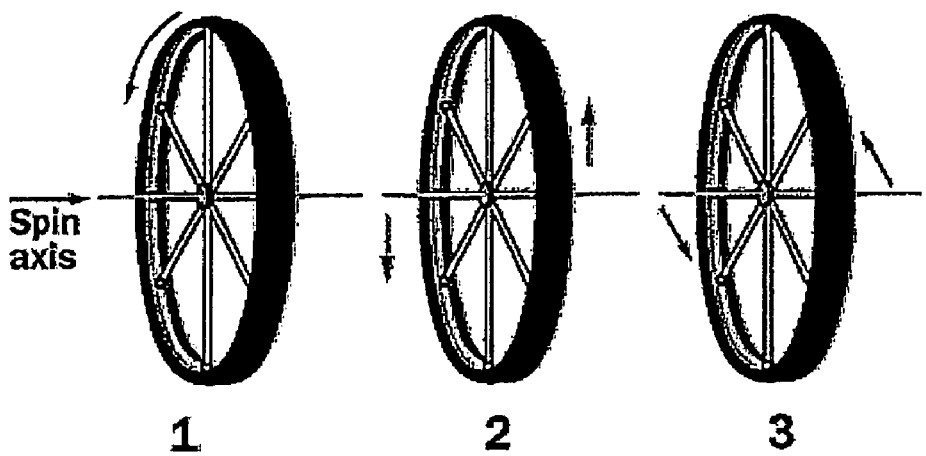
FIG. 1 shows the gyroscopic effect produced on a rotating body, such as a wheel.
Figure 1:
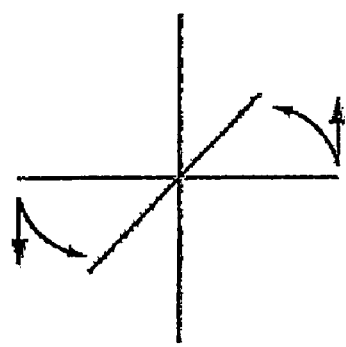
Figure 2:
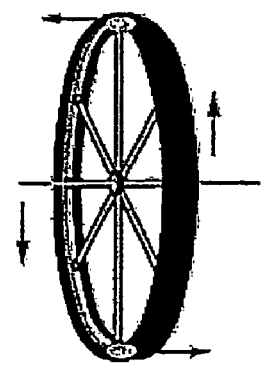
FIG. 2 shows the force applied to try to rotate the spin axis.
Figure 3:
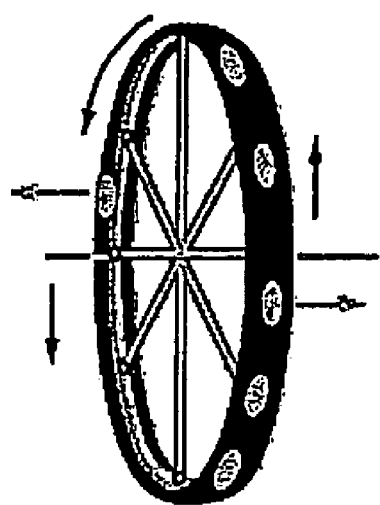
FIG. 3 shows how the gyroscope reacts to the input force along an axis perpendicular to the input force.
Figure 4:
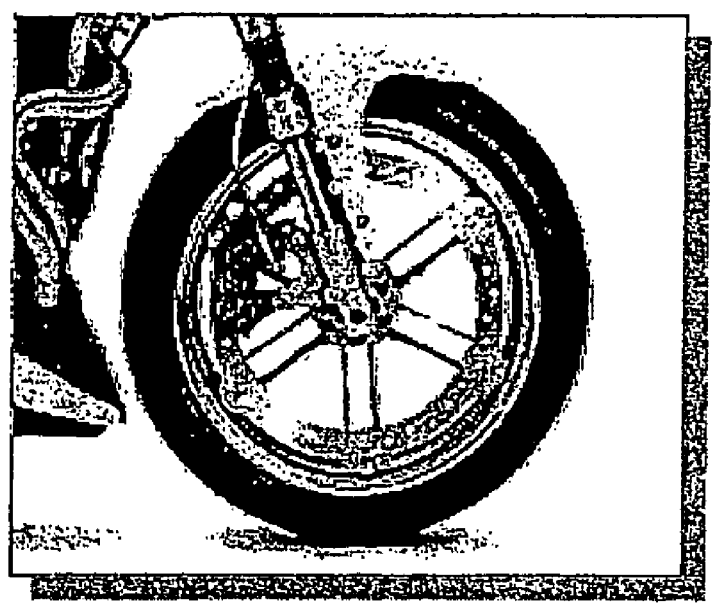
FIG. 4 shows a part of a motorcycle with prior art attempts to reduce gyroscopic force produced during operation of the motorbike.

By utilising the principles described above in connection with FIGS. 1 to 3, it is possible to validate the concept disclosed herein that when two identical objects in size and mass are rotated in opposite directions and the spin axis of this gyroscope is then rotated, as in FIG. 1, the gyroscope will not precess as the gyroscopic forces created by each mass as they will each generate forces which will act against each other, at the limit preferably effectively cancelling one another out or at least reducing the gyroscopic effect produced by rotation of the wheel.

In the preferred embodiment, the aim is not to cancel the gyroscopic forces within a rotating motorcycle wheel completely, as this will destabilise the vehicle too much. Motorbike riders utilise the gyroscopic effect to stay upright. The aim, therefore, is to reduce the overall gyroscopic forces generated by the rotating wheels without making the vehicle unduly unstable.

The concept of reversing the rotational direction of the brake discs to the wheel on a motorcycle will reduce the gyroscopic stabilising force on the vehicle, causing it to "roll" quicker. As a motorcycle turns, it is rolled or leant inwardly to counteract the centrifugal force being created while turning. The act of leaning the vehicle over also causes the vehicle to turn in that direction as the tyres are now running on their sides. If a rider can roll/lean a motorcycle quicker, the bike can be turned quicker.

As the principle relies on the gyroscopic force of the disc to cancel out some of the gyroscopic forces created by the wheel and tyre, the system can be tuned by altering the mass of the wheel disc to increase or decrease the gyroscopic force, therefore changing the roll rate of the bike.

Referring to FIG. 5, the embodiment shown is designed for a motorbike and includes a tyre and wheel assembly 10 which are formed integrally with a wheel carrier 12. The wheel carrier 12 is supported on an axle 14 through bearings 16. These components of the wheel assembly are conventional.

A brake disc 18 is also mounted on the axle 14 by means of an integral brake disc carrier 20 and bearings 22. The brake disc 18 is coupled to the tyre and wheel assembly 10 by means of a gear assembly including first and second sets of crown gears 24,26, respectively, which co-operate with one another through a pinion gear 28. The gear assembly 24-28 is designed such that the brake disc 18 rotates in the opposite direction to the tyre and wheel assembly 10 so as to produce a counteracting gyroscopic force, dependant, in this embodiment, upon the relative weights, on the one hand, of the wheel and tyre assembly 10 and, on the other hand, of the brake disc 18 and brake disc carrier 20 assembly. In another embodiment, component 18 may be a flywheel configured in the same way as described above with respect to brake disc 18.

The embodiment of FIG. 5 was built as a test rig which, when rotated, allowed the operator to feel the difference in gyroscopic output through his/her hands.

The embodiment of FIG. 5 utilises bevelled gears 24-28 to reverse the rotational direction of the wheel 10 to disc 18. However, in practice, it is envisaged the system would use conventional gears arranged in a similar way to a planetary gearbox. A system using a planetary style gearbox would be preferable as it would be able to transmit greater breaking forces and have less running friction. An embodiment is described below with reference to FIGS. 6 and 7.

Referring again to FIG. 5, the bevelled gear design operates as follows. When the axle 14 is retained, preventing its rotation, and the wheel 10 is rotated in any direction about the axle 14, the crown gear 26 attached to the wheel carrier 12 also rotates. This then forces the pinion gears 28 to rotate about their own axis. In turn, the other crown gear 24, which is attached to the brake disc carrier 20, then forces the brake disc 18 to rotate in the opposite direction to the wheel.

Figure 6:
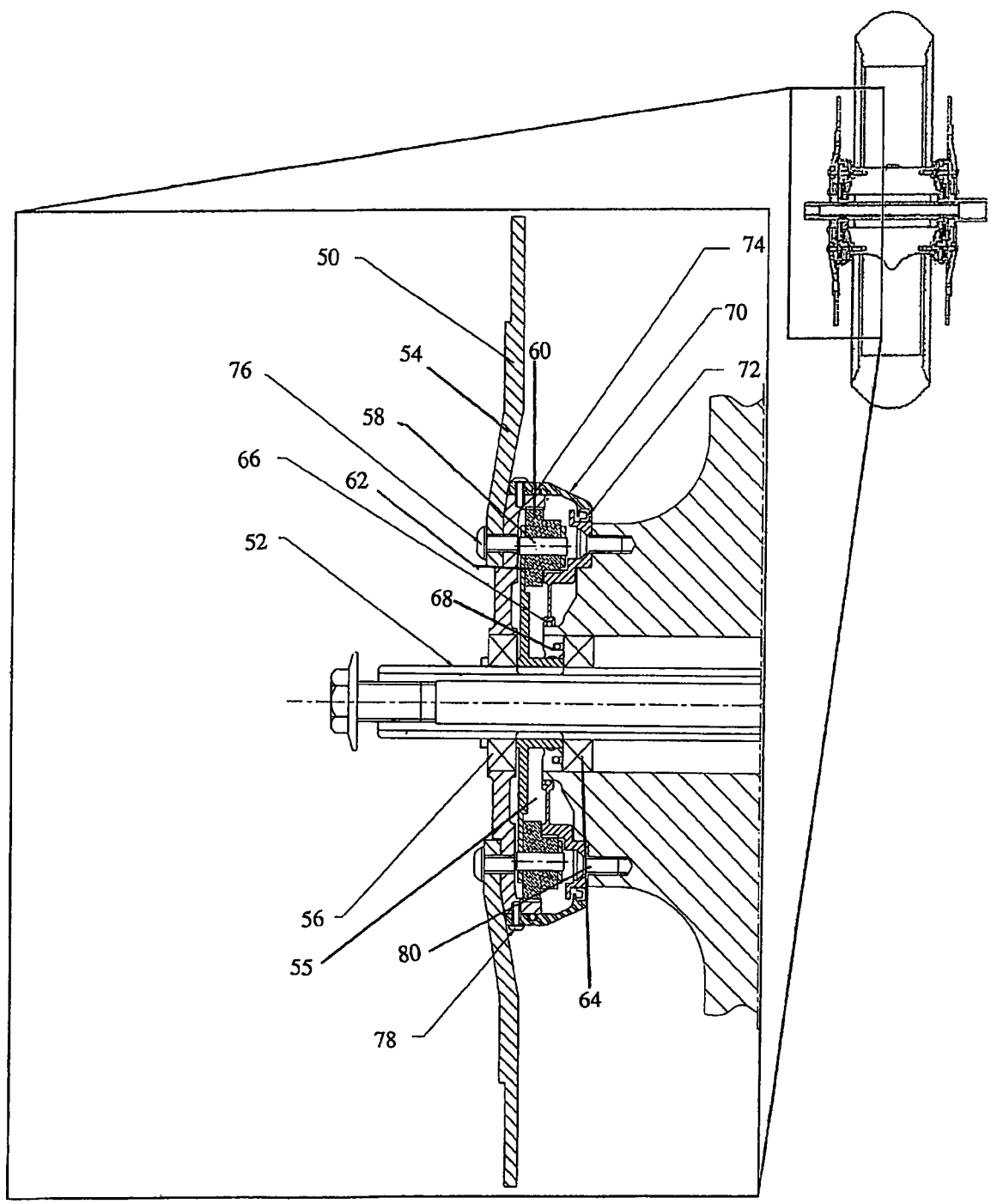
FIG. 6 shows an embodiment of epicyclical gear assembly for driving in counter-rotation of vehicle brake disc.
Figure 7:
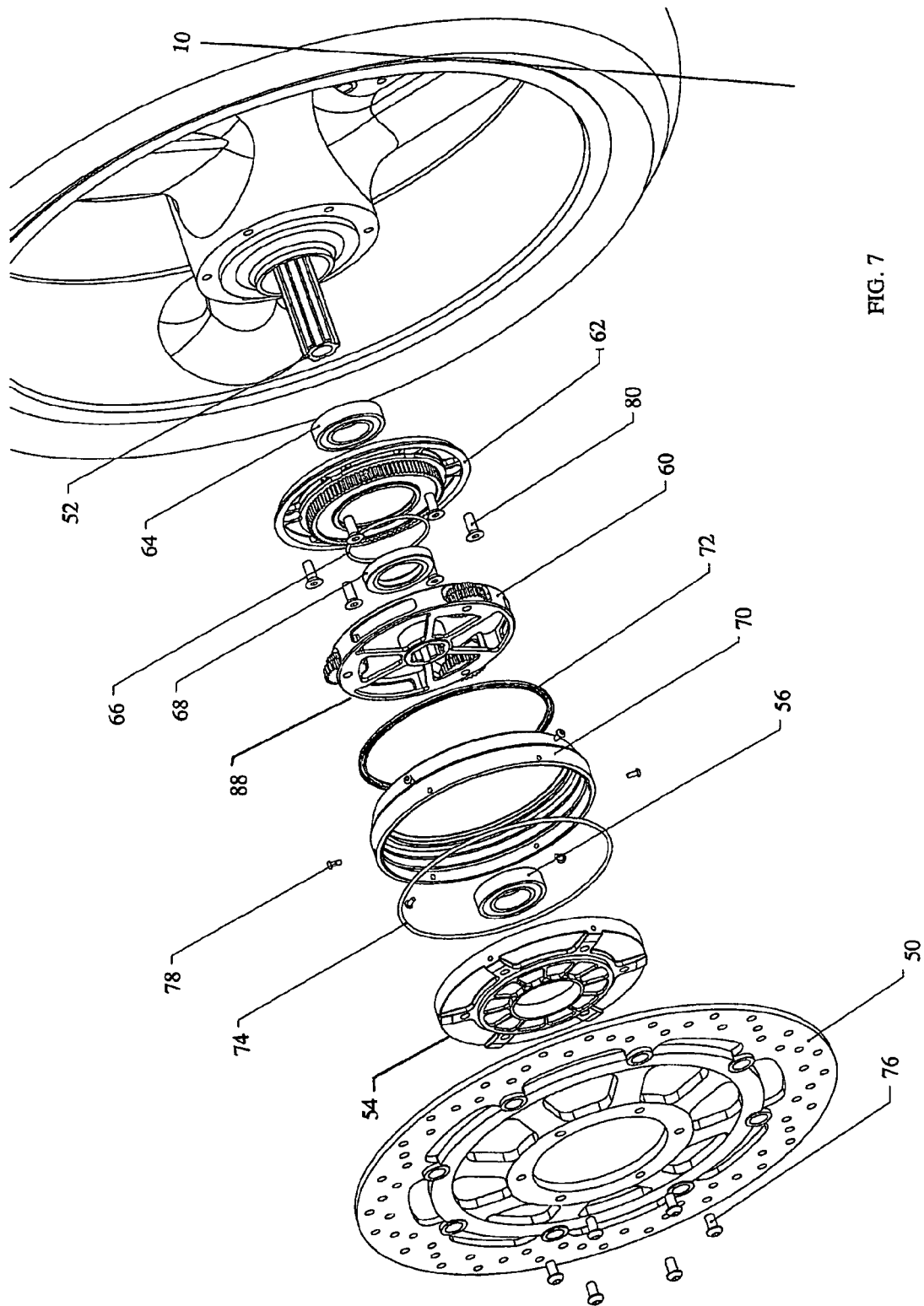
FIG. 7 is an exploded view of the epicyclical gear assembly of FIG. 6.

Referring now to FIGS. 6 and 7, there is shown an embodiment of planetary gear assembly designed to cause the brake disc to counter-rotate. The brake assembly includes a brake disc 50 equivalent to the disc 18 of the embodiment of FIG. 5, which is located on the wheel spindle 52 upon which the wheel 10 is fitted. Coupled to rotate with the brake disc 50 is an outer gear 54, which is located on the wheel spindle 52 by an outer wheel bearing 56 and which is provided with an internally extending annulus of gear teeth 55.

A planet gear assembly 58 carries a plurality of planet gears 60 at its outer circumference, which mesh with a sun gear 62 which is fitted to an inner wheel bearing 64.

The assembly is also provided with the following ancillary components: sun gear "O" ring 66, a carrier lip seal 68, a cover 70 provided with a cover lip seal 72 and cover "O" ring 74, together with the necessary fixing screws 76-80. The screws 80 fix the sun gear to the wheel 10 for rotation therewith.

In operation, the wheel 10 rotates around the wheel spindle 52, the latter not rotating. The planet carrier assembly 58, being fixed to the wheel spindle 52, also does not rotate but its planet gears 60 are caused to rotate by the rotation of the sun gear 62, the latter rotating with the wheel. The rotation of the planet gears 60, by their meshing with the annular gear teeth 55 of the outer gear 54, causes rotation of the outer gear 34 and hence of the brake disc 50. The skilled person will appreciate that the outer gear 54 and hence the brake disc 50 will rotate counter to the direction of rotation of the wheel 10.

The disclosures in British patent application no 0221575.4, from which this application claims priority, and in the abstract accompanying this application are incorporated herein by reference.

The invention claimed is:

1. A vehicle including at least first and second wheels, at least one weight associated with one of said wheels, and a rotation device operable to rotate the weight in an opposite direction to the direction of rotation of said wheel, wherein the weight is, or is part of, a braking system of the vehicle, and wherein the weight comprises a brake disc arranged to rotate in the opposite direction to the direction of rotation of the wheel with which it is associated.

2. A vehicle according to claim 1, further including a planetary gear mechanism coupled to the weight for rotating the weight on the basis of rotation of the vehicle wheel.

3. A vehicle according to claim 1, wherein the weight is designed to provide a gyroscopic effect which reduces a gyroscopic effect produced by the associated wheel or wheels of the vehicle.

4. A vehicle according to claim 1, wherein the weight is coupled to said wheel or wheels to impart a gyroscopic effect which substantially cancels out a gyroscopic effect produced by said wheel or wheels of the vehicle.

5. A vehicle according to claim 1, wherein the vehicle is a motorcycle.

6. A vehicle brake assembly including a brake disc and a gear mechanism coupled to the brake disc, the gear mechanism being operable to cause rotation of the brake disc in a direction opposite to the direction of rotation of the wheel with which it is associated.

7. A vehicle brake assembly according to claim 6, wherein the gear mechanism is a planetary gear mechanism.

8. A vehicle brake assembly according to claim 7, wherein the vehicle brake assembly includes a wheel spindle, wherein the planetary gear mechanism includes a planet gear carrier, and wherein the planet gear carrier is unable to rotate about the wheel spindle of the vehicle brake assembly.

9. A vehicle brake assembly according to claim 8, wherein the wheel spindle does not rotate and wherein the planet gear carrier is fixed to the wheel spindle.

10. A vehicle brake assembly according to claim 6, wherein the gear mechanism is a beveled gear mechanism.

11. A vehicle comprising a vehicle brake assembly according to claim 6.

* * * * *